United States Patent [19]

Moorhead et al.

[11] 3,878,501

[45] Apr. 15, 1975

[54] ASYMMETRICAL DUAL PTCR PACKAGE FOR MOTOR START SYSTEM

[75] Inventors: William L. Moorhead; Manfred Kahn, both of Williamstown, Mass.

[73] Assignee: Sprague Electric Company, North Adams, Mass.

[22] Filed: Jan. 2, 1974

[21] Appl. No.: 430,337

[52] U.S. Cl. ............ 338/22 R; 317/100; 317/234 A; 338/23; 338/235; 338/320
[51] Int. Cl. ............................................. H01c 7/04
[58] Field of Search ....... 317/100, 234 A; 338/22 R, 338/22 SC, 23, 24, 25, 235, 320, 204, 205, 220; 219/505, 506, 507; 73/362

[56] References Cited
UNITED STATES PATENTS

| | | | |
|---|---|---|---|
| 2,769,071 | 10/1956 | Ward | 338/22 |
| 3,307,167 | 2/1967 | Race | 317/41 |
| 3,586,939 | 6/1971 | Buiting et al. | 318/221 E |
| 3,673,538 | 6/1972 | Faxon | 323/69 X |
| 3,737,752 | 6/1973 | Stachan | 318/221 E |

*Primary Examiner*—J. D. Miller
*Assistant Examiner*—Patrick R. Salce
*Attorney, Agent, or Firm*—Connolly and Hutz

[57] ABSTRACT

A motor start and run system for a single phase motor provides a predetermined period for starting the motor during which power is delivered to a start winding of the motor. It also provides a time delay after the motor is deenergized before the motor may be restarted. These two control times are essentially determined by thermal time constants associated with a package having two PTCRs. These two PTCRs are thermally coupled and have different anomaly temperatures. A dual-PTCR package is also disclosed for use in said motor start system having provision for strongest thermal coupling with the environment for the PTCR having the higher anomaly temperature.

3 Claims, 5 Drawing Figures

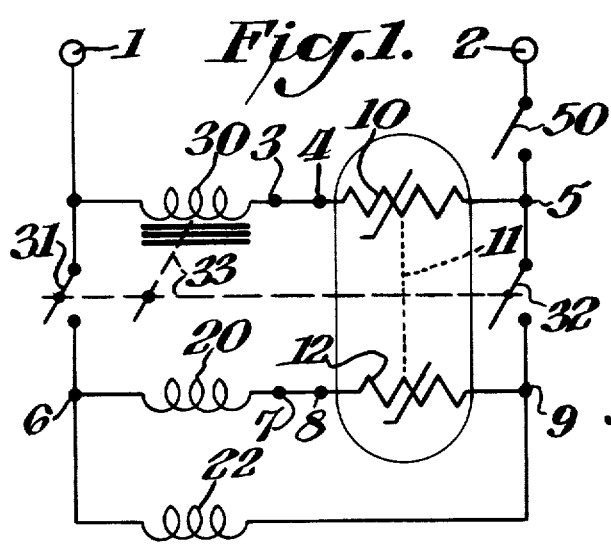
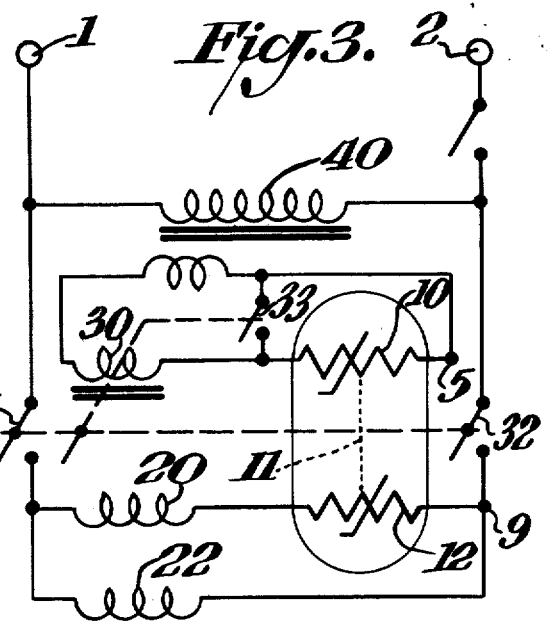
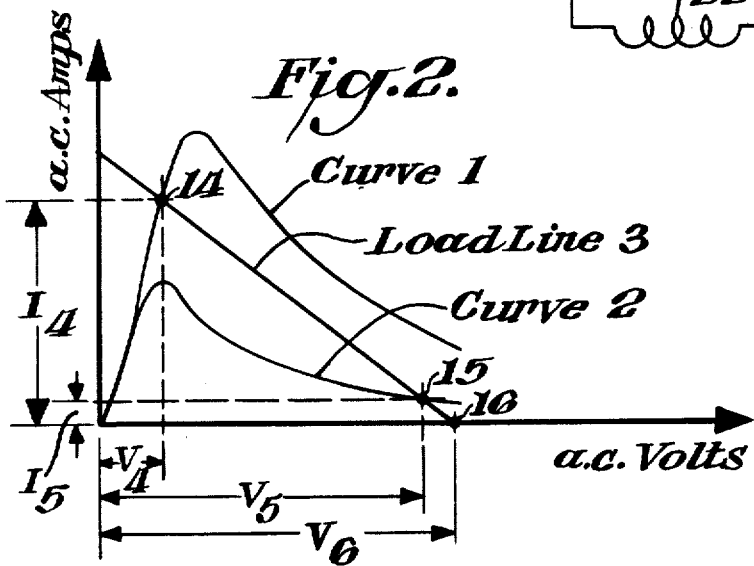
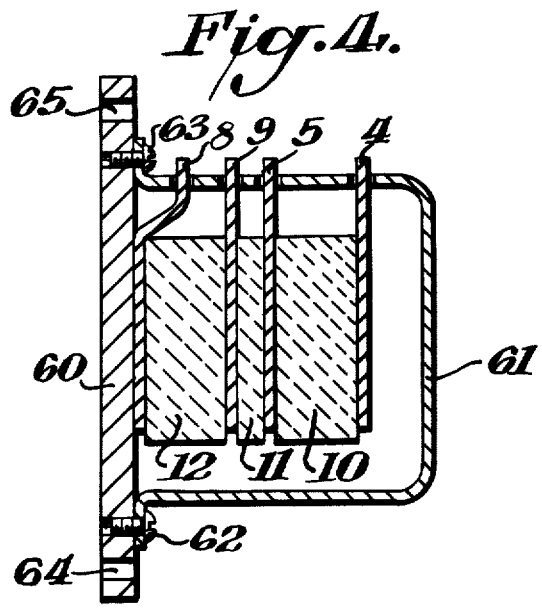
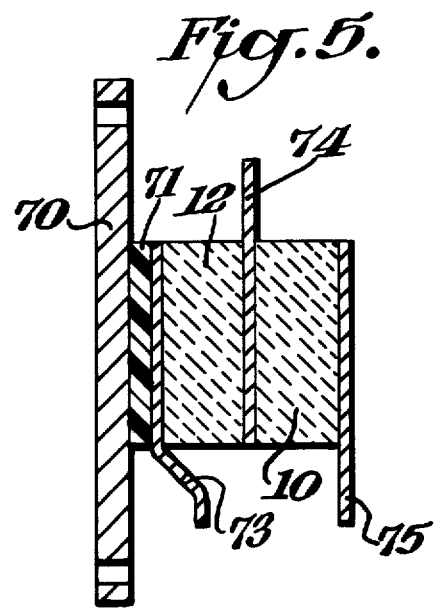

ASYMMETRICAL DUAL PTCR PACKAGE FOR MOTOR START SYSTEM

BACKGROUND OF THE INVENTION

This invention relates to a thermistor package for use in an a.c. motor start and run system. In such systems, the motor has a main winding, and a start or auxiliary winding. During start both windings are energized. During normal run conditions the main winding is always energized whereas the start winding for certain motor designs is deenergized and for other cases the running current in the start winding is supplied at a reduced value. Potential relays, current relays, and centrifugal switches have been traditionally used to provide this function. These devices tend to be expensive and unreliable.

It is known to use a thermistor such as a positive temperature coefficient resistor (PTCR) as a time delay element in a motor control system for automatically determining the start period duration avoiding the shortcomings of the aforementioned traditional devices. The PTCRs of interest herein are of the type having an anomaly temperature above which the electrical impedance of the PTCR is several orders of magnitude greater than it is for temperature below the anomaly temperature.

A second function that a motor control system desirably performs is that of preventing restart for a period after deenergization to allow for instance a time for the motor driven compressor system to equalize pressure, or to allow time for an overheated motor to cool to a safe temperature. Electromechanical timers have been used to provide this function as have temperature responsive elements or switches that are thermally coupled to the motor.

The conventional system using a single PTCR in series with a motor start winding to accomplish the start function, has the shortcoming of a non-definitive restart function such that a premature attempt to restart the motor has the effect of providing an abnormally short start period that in turn may result in improper or sluggish starting. Furthermore, in many motor start systems it is desirable to keep both the start and main windings disconnected from the line during the restart delay period, which the single PTCR system cannot do without the addition of more components and additional circuit complexity.

It is therefore an object of this invention to provide a simple low-cost motor control system.

It is a further object of this invention to provide a motor control system capable of disconnecting both start and main motor windings from the power line during a predetermined nonrestart period.

It is a further object of this invention to provide a motor control system having a definitive restart characteristic.

It is a further object of this invention to employ in a motor control system a package of PTCRs whose thermal characteristics determine the motor start period and the delay to restart period.

A PTCR package comprises a first and second PTCR having thermal coupling therebetween. The first PTCR has a lower anomaly temperature than the second PTCR. The thermal coupling between PTCR's may be achieved by sandwiching a metal plate therebetween or alternatively by sandwiching a layer of insulating material therebetween. The second PTCR is provided a stronger thermal coupling to the package environment than the first PTCR. The package of this invention is advantageously employed in an a.c. motor start and run system whereby the second PTCR is electrically connected in series with the motor start winding. The first PTCR is connected to the input of a switching control means, that may be a solenoidal relay having hysteresis, such that activation of the switches may not be initiated when the first PTCR is in the high impedance state, and such that the two motor winding circuits are connected to a power source only when the first PTCR is initially in a low impedance state, and so that the motor winding circuits are held closed when the first PTCR is heated above its anomaly temperature to a high impedance state by thermal energy from the second PTCR.

BRIEF DESCRIPTION OF THE DRAWINGS

FIG. 1 shows a schematic diagram of a motor start and run system employing a relay and a dual PTCR package of this invention.

FIG. 2 shows a graph of two characteristic volt-amp curves of a PTCR and their necessary relationship to a load line, according to the principles of the present invention.

FIG. 3 shows a schematic diagram of another motor start and run system employing a dual PTCR package of this invention.

FIG. 4 shows in cross section a PTCR package of this invention having a selective heat removal means.

FIG. 5 shows in cross section a second package of this invention.

DESCRIPTION OF THE PREFERRED EMBODIMENTS

FIG. 1 shows a diagram of a motor start and run system of this invention. A first PTCR 10 is shown having a thermal connection 11 with a second PTCR 12. The first PTCR 10 has a lower anomaly temperature than the second PTCR 12. It is well known to make PTCR bodies having different anomaly temperatures, as shown in the "Effect of Heat-Treatment On the PTCR Anomaly in Semiconducting Barium Titanate," by M. Kahn; pages 676-680, American Ceramic Society Bulletin Vol. 50, No. 8, August 1971. Winding 20 is the start winding of a split phase a.c. motor having a main or run winding 22. The start winding 20 is connected in series with the second PTCR 12. An electromechanical relay has a coil 30 connected in series with the first PTCR 10. When an a.c. power source (not shown) is connected to terminals 1 and 2, and when a manual switch 50 is closed, power is applied to the relay coil 30 and the series connected PTCR 10. Since at start, the PTCR 10 is at or near room temperature, it is in its low impedance state and an initial current flows in the relay coil 30 causing switches 31 and 32 to close. A mechanical connection 33 represents a part of the magnetically activated moving member of the relay linking the coil 30 and the switches 31 and 32. This initial current is predominately limited by the resistance of the relay coil 30 and is low enough, that accounting for the thermal properties of PTCR 10 and particularly its thermal coupling with the environment, the initial starting current is not large enough to cause the PTCR 10 to reach its anomaly temperature and its high resistance state during this period when the motor is starting. Thus PTCR 10 cannot self heat.

Self heating of PTCR 10 is avoided by using a relay whose coil impedance is high enough in series with a PTCR whose characteristic power dissipation is high enough that at room temperature the voltage across it will not be sufficient to cause the PTCR to switch to its high impedance state. This condition is illustrated by the graph of FIG. 2, wherein curve 1 represents a PTCR volt-ampere characteristic, typical for PTCR 10, with no external heat applied, curve 2 represents the volt-amp characteristic of the same PTCR with a given amount of heat being applied, as from the second thermally coupled PTCR 12 of FIG. 1, and the straight line 3 represents the load line of the series impedance, corresponding in FIG. 1 to the impedance of the relay coil. The load line 3 has a slope corresponding to the relay coil impedance and it intersects the voltage axis at point 6 where the supply voltage is shown as $V_6$. This load line should also account for any additional impedances that may be in series with the PTCR 10.

Note that there is only one intersection of the load line 3 with curve 1, namely point 14 at which the voltage $V_1$ appearing across the PTCR 10 is relatively small and the current $I_1$ through PTCR 10 is relatively large. However, when external heat is simultaneously applied to PTCR 10, the PTCR 10 is characterized by curve 2 in FIG. 2 and, a second stable operating point, namely 15, is achieved at which the voltage $V_5$ across the PTCR 10 is relatively large and the current $I_5$ in the circuit is relatively small. In the practice of the instant invention it is essential that there be only one stable operating point (points 14 and 15) associated with each of the two curves (curves 1 and 2) and thus the two steady state conditions of PTCR 10, namely externally heated and not externally heated.

When the relay is initially activated and switches 31 and 32 are first closed, the second PTCR 12 in series connection with the motor start winding 20 is supplied power from the a.c. power source. Likewise, power is supplied to the motor main winding 22. Since the second PTCR 12 is initially at or near room temperature, it is in its low impedance state and a large current flows in the start winding 20. Thus, the motor starts with both windings 20 and 22 connected to the source of a.c. power.

A short time after switch 50 is closed, normally about ½ second, the motor has essentially achieved normal full running speed. The current through the low impedance start winding is high enough to heat PTCR 12 so that it reaches its anomaly temperature when the motor is expected to have achieved full running speed. At this point the impedance of PTCR 12 abruptly increases by several orders of magnitude and reduces the current in the start winding accordingly. The PTCR 12 continues to self heat sufficiently to maintain its temperature above the anomaly temperature. It supplies thermal energy via the thermal coupling 11 to the first PTCR 10 causing the temperature of the first PTCR 10 to rise and remain above its anomaly temperature. This in turn reduces the current in the relay coil 30 to a level $I_5$ that is below the relay pull-in-current but above the drop-out-current. Thus the relay remains activated during normal run conditions. The inherent hysteresis of the relay is thereby seen to be used here. Other switching control means may alternatively be used, having a memory and logic capability to achieve the same result, particularly those using silicon control rectifiers and integrated semiconductor logic devices.

It can be seen that if for any reason power is interrupted, for example at the power source itself or by opening switch 50 or by opening the series relay 30 and PTCR 10 circuit, then the relay current will fall to zero, and switches 31 and 32 will open. If power is immediately or soon thereafter restored to the circuit, the current in the relay coil 30 is limited by the hot high impedance of PTCR 10 to a level below the pull-in current of the relay, and the motor will not start. The motor is prevented from starting until the temperature of PTCR 10 falls below its anomaly temperature. This time delay for restart is designed to be long enough for the particular motor employed to cool to a safe temperature assuming that power was initially removed in response to a fault and the motor having overheated. A typical delay to restart time is on the order of three minutes. The wire link shown between terminals 3 and 4 may be removed and a heat sensitive switch that is thermally connected to the motor may be electrically connected between terminals 3 and 4 to accomplish this function. Such heat sensitive switches may be a third PTCR (not shown) or a bimetallic switch (not shown).

Many other variations of this circuit are possible. The relay may be provided with a third set of normally open contacts connected between terminals 4 and 9 such that the relay is held activated thereby during normal run conditions. A resistor may be added in series with this third set of contacts. The relay holding current is determined in these ways without dependence on the particular value of hot high impedance of the PTCR 10. Alternatively a resistor may be permanently connected in parallel with PTCR 10 to help guarantee that the relay will see the proper value of holding current or to guarantee a shape of the equivalent volt-ampere curve that provides only one intersect with the load line at all internal temperatures of PTCR 10.

Also, when a capacitor start motor is employed a start capacitor may be substituted for the link shown between terminals 7 and 8 in series with the start winding 20. It also may be desirable to additionally connect a smaller capacitor to terminals 8 and 9 in parallel with the second PTCR 12 so that during run conditions a low value quadriture current will flow in the start winding and contribute to running power and smoothness of motor operation as is well known to the art.

A further alternative involves modification of the impedance in series with PTCR 10. A resistor may be added, for example in place of the wire link between points 3 and 4 of FIG. 1, in order to adjust the load line slope as shown in FIG. 2 and thus to meet the necessary relative relationships between the volt-amp characteristics (curves 1 and 2 in FIG. 2) as previously described.

Another motor start system is shown in FIG. 3, being similar to that of FIG. 1 except having a separated and isolated a.c. power source supplying the series relay coil 30 and PTCR 10. This is accomplished by connecting a transformer 40 with the primary to the first power source and the secondary to the series coil 30 and PTCR 10 circuit. A third relay switch 33 is shown shunting the PTCR 10, illustrating how a relay may be held activated during normal run conditions. The transformer 40 is preferably a voltage step down type so that the cost of the relay and PTCR 10 may be reduced. The isolated power sources also permit the electrical connection between the two PTCRs, for example a connection between terminals 5 and 9, that may simplify and make less expensive the PTCR's package assembly.

In the aforementioned motor start systems it is preferred that upon interruption of power to the control circuit that the second PTCR 12 cool to a temperature below the anomaly temperature thereof before the first PTCR 10 cools to a temperature below its own anomaly temperature. In this manner, the PTCR 10 will reach a low impedance state and permit closure of the relay and restart of the motor after the PTCR 12 has reached its low impedance state. It is accordingly preferred to use a dual PTCR package wherein the second PTCR (e.g., PTCR 12) has a stronger thermal coupling to the environment than the first PTCR. However, the circuit can be designed with a dual PTCR package wherein the two PTCRs have the same thermal coupling to the environment.

The time difference between these two events is preferably long enough for the temperature of PTCR 12 to fall near its quiescent steady state room temperature condition. Thus upon restarting, the start time period during which the high current flows in the start winding is always of a uniform length and a reliable and definitive delay-to-start system is realized. Furthermore, premature attempts to restart the motor may never result in an abnormally short start time, as is the case for conventional PTCR start systems.

In FIG. 4 is shown a dual PTCR package suitable for use in the motor start system of the present invention. A first PTCR element 10 is contacted by and in this embodiment bonded to two metal plates having extensions 4 and 5 serving as electrical terminals therefor. A second PTCR element 12 is contacted by two metal plates having extensions 8 and 9 serving as electrical terminals thereof. An electrically insulating thermally conducting part 11 serves to thermally couple the PTCR element 10 with the PTCR element 12, and may consist of a thin wafer of ceramic material. These parts may be bonded together and further attached to a metal base 60. Alternatively the PTCR's and metal plates stack may not be interbonded, but rather be mounted and held in compression by adding an insulating block (not shown) between plate 4 and the roof of housing 61, or by other means. A metal housing 61 contains the PTCR elements and is attached by screws 62 and 63 to the base 60. Holes 65 and 64 in base 60 provide means for screw mounting the PTCR package in thermal contact with a flat heat sinking surface that is maintained at room ambient temperature. The first PTCR 10 has a lower anomaly temperature than the second PTCR 12 and the second PTCR is in stronger more direct thermal contact with the package environment so as to cool at a faster rate. Thus this dual PTCR package is seen to be uniquely appropriate for use in the motor start system of this invention.

For motor control systems where there is no requirement for switching open both sides of the line, simplification of both the circuit and the PTCR package is possible. For example, in FIG. 1 switch 32 may be eliminated and replaced with a short circuit. It is seen that one lead of PTCR 10 is in this instance always connected to one lead of PTCR 12. Thus as shown in FIG. 5 the PTCR's 10 and 12 may be packaged with one common lead 74. The two other leads 73 and 75 are of course independent. Also illustrated in this embodiment of the package of this invention is the addition of an insulating layer 71 that may be a thin plastic film such as 0.001 inch polyethyleneterephthalate. Such a film provides electrical isolation between the PTCRs, particularly lead 73, and a metal base 70. This thin but relatively broad film also serves as an efficient thermal coupling between the PTCR 12 and the base 70.

What is claimed is:

1. A PTCR package comprising a first and a second PTCR being thermally coupled therebetween, said first PTCR having a lower anomaly temperature than said second PTCR, and a selective heat removal means for providing stronger thermal coupling of said second PTCR than that of said first PTCR to the environment of said package.

2. The PTCR package of claim 1 further comprising a metal plate wherein said thermal coupling between said PTCRs is accomplished by mounting said first and second PTCRs to opposite sides of said metal plate, an extension of said plate serving as a common lead thereto.

3. The PTCR package of claim 1 further comprising a first and second metal plate being mounted to opposite sides of said first PTCR, a third and fourth metal plate being mounted to opposite sides of said second PTCR, and an electrically insulating layer, said thermal coupling between said PTCRs being accomplished by mounting said insulating layer between said second plate and said third plate, and said plates each having an extension serving as an electrical lead so that independent electrical access is provided to each said PTCR.

* * * * *